United States Patent [19]

Adolph et al.

[11] Patent Number: 5,266,675
[45] Date of Patent: Nov. 30, 1993

[54] ENERGETIC POLYMER

[75] Inventors: Horst G. Adolph, Burtonsville; Donna M. Cason-Smith, Columbia, both of Md.

[73] Assignee: The United States of America as represented by the Secretary of the Navy, Washington, D.C.

[21] Appl. No.: 912,420

[22] Filed: Jul. 13, 1992

[51] Int. Cl.$^5$ .............................................. C08G 4/00
[52] U.S. Cl. .................................. 528/230; 528/244; 528/266; 528/422
[58] Field of Search ................ 528/230, 244, 266, 422

[56] References Cited

U.S. PATENT DOCUMENTS 4,000,730  2/1990  Nock et al. ................... 528/244
4,000,784  6/1990  Adolph et al. ............... 528/241

Primary Examiner—Samuel A. Acquah
Attorney, Agent, or Firm—Roger D. Johnson

[57] ABSTRACT

Energetic dihydroxy-terminated copolyformals which are formed from formaldehyde and dinitraminediol and fluorodiol comonomers wherein the dinitraminediol is
$HOCH_2N(NO_2)CH_2N(NO_2)CH_2N(NO_2)CH_2OH$,
$HOCH_2N(NO_2)CH_2N(NO_2)CH_2N(NO_2)CH_2N(NO_2)CH_2OH$, or mixtures thereof, and wherein the fluorodiol is
$HOCH_2CF_2CF_2CF_2CH_2OH$,
$HOCH_2CF_2CF_2CF_2CF_2CH_2OH$,
$HOCH_2CF(CF_3)OCF_2CF_2CF_2CH_2OH$,
$HOCH_2CF_2OCF_2CF_2OCF_2CH_2OH$,
$HOCH_2CH_2(CF_2)_2CH_2CH_2OH$,
$HOCH_2CH_2(CF_2)_4CH_2CH_2OH$,
$HOCH_2CH_2(CF_2)_6CH_2CH_2OH$,
$HOCH_2CH_2(CF_2)_8CH_2CH_2OH$,
$HOCH_2CH_2(CF_2)_{10}CH_2CH_2OH$,
or mixtures thereof and wherein the terminal functional groups are fluorodiol monomer hydroxy groups.

16 Claims, No Drawings

ENERGETIC POLYMER

BACKGROUND OF THE INVENTION

This invention relates to polymers and more particularly to energetic polymers for use in propellant and explosive binders.

Propellant and explosive binders are generally composed of a polymer and a plasticizer, both or either of which is energetic. A variety of energetic polymers have been evaluated for use in these binders. Some contain relative unstable energetic groups such a nitrato (thermally labile) or azido (light sensitive). Others contain gem-dinitro or fluorodinitro moieties which are more stable but generally difficult to synthesize and therefore expensive. For these and other reasons the search continues for new energetic polymers.

SUMMARY OF THE INVENTION

Accordingly, an object of this invention is to provide new energetic polymers for use in propellant and explosive binders.

Another object of this invention is to provide new energetic polymers that are more stable to heat and light.

A further object of this invention is to provide new stable energetic polymers that are less expensive to produce.

These and other objects of this invention are achieved by producing:
a dihydroxy-terminated copolyformal formed from
A. formaldehyde and
B. a diol comonomer mixture of
(1) a nitraminediol which is
$HOCH_2N(NO_2)CH_2N(NO_2)CH_2N(NO_2)CH_2OH$,
$HOCH_2N(NO_2)CH_2N(NO_2)CH_2N(NO_2)CH_2N(NO_2)CH_2OH$,
or mixtures thereof, and
(2) a fluorodiol which is
$HOCH_2CF_2CF_2CF_2CH_2OH$,
$HOCH_2CF_2CF_2CF_2CF_2CH_2OH$,
$HOCH_2CF(CF_3)OCF_2CF_2CF_2CH_2OH$,
$HOCH_2CF_2OCF_2CF_2OCF_2CH_2OH$,
$HOCH_2CH_2(CF_2)_2CH_2CH_2OH$,
$HOCH_2CH_2(CF_2)_4CH_2CH_2OH$,
$HOCH_2CH_2(CF_2)_6CH_2CH_2OH$,
$HOCH_2CH_2(CF_2)_8CH_2CH_2OH$,
$HOCH_2CH_2(CF_2)_{10}CH_2CH_2OH$,
or mixtures thereof and
wherein the nitraminediol comprises from about 10 to about 60 mole percent of the diol comonomer mixture with the fluorodiol being the remainder. The terminal functional groups of the copolyformal are essentially all fluorodiol monomer hydroxy groups.

DETAILED DESCRIPTION OF THE PREFERRED EMBODIMENT

The polymers of the present invention are prepared by the polycondensation of nitraminediols and fluorodiols with formaldehyde in sulfolane/boron trifluoride etherate solvent. The resulting nitramine and fluoro monomeric units will be more or less randomly distributed in the polymeric chain with formal ($-OCH_2O-$) linkages between monomeric units. Due to the absence of side reactions in the propagation and termination steps of the polymerization reaction and because of the treatment of the crude copolyformal with $H_2O_2$ in the presence of base, the copolymers described here are nearly 100 percent difunctional and exclusively terminated by fluorodiol monomer hydroxy groups (fluorodiol-derived hydroxy terminal groups). This characteristic is useful because it results in reproducible curing in cast curable compositions, and because it permits the synthesis of well-defined block copolymers.

The nitraminediols which may be used in this invention include:
(1) 1,7-dihydroxy-2,4,6-trinitro-2,4,6-triazaheptane,
$HOCH_2N(NO_2)CH_2N(NO_2)CH_2N(NO_2)CH_2OH$;
(2) 1,9-dihydroxy-2,4,6,8-tetranitro-2,4,6,8-tetraazanonane,
$HOCH_2N(NO_2)CH_2N(NO_2)CH_2N(NO_2)CH_2N(NO_2)CH_2OH$;
or mixtures thereof.

The fluorodiols which may be used in this invention include:
(1) 2,2,3,3,4,4-hexafluoropentane-1,5-diol,
$HOCH_2CF_2CF_2CF_2CH_2OH$;
(2) 2,2,3,3,4,4,5,5-octafluorohexane-1,6-diol,
$HOCH_2CF_2CF_2CF_2CF_2CH_2OH$; and
(3) 2,4,4,5,5,6,6-heptafluoro-2-trifluoromethyl-3-oxaheptane-1,7-diol,
$HOCH_2CF(CF_3)OCF_2CF_2CF_2CH_2OH$;
(4) 2,2,4,4,5,5,7,7-octafluoro-3,6-dioxaoctane-1,8-diol,
$HOCH_2CF_2OCF_2CF_2OCF_2CH_2OH$;
(5) 3,3,4,4-tetrafluorohexane-1,6-diol,
$HOCH_2CH_2(CF_2)_2CH_2CH_2OH$;
(6) 3,3,4,4,5,5,6,6-octafluorooctane-1,8-diol,
$HOCH_2CH_2(CF_2)_4CH_2CH_2OH$;
(7) 3,3,4,4,5,5,6,6,7,7,8,8-dodecafluorodecane-1,10-diol,
$HOCH_2CH_2(CF_2)_6CH_2CH_2OH$;
(8) 3,3,4,4,5,5,6,6,7,7,8,8,9,9,10,10-hexadecafluorododecane-1,12-diol,
$HOCH_2CH_2(CF_2)_8CH_2CH_2OH$;
(9) 3,3,4,4,5,5,6,6,7,7,8,8,9,9,10,10,11,11,12,12-eicosafluorotetradecane-1,14-diol,
$HOCH_2CH_2(CF_2)_{10}CH_2CH_2OH$;
or mixtures thereof.

The diol comonomer mixture of the nitraminediol and the fluorodiol is composed of from about 10 to about 60, preferably from 30 to 60, more preferably from 40 to 60, and most preferably about 50 mole percent of the nitraminediol with the remainder of the diol comonomer mixture being the fluorodiol. The combination of nitraminediol and fluorodiol monomers provides polymers with much lower glass transition temperatures ($T_G$) than can be obtain with nitraminediol homopolyformals, and at the same time provides polymers with a significant energy content. The $T_G$ decreases with increasing mole percent of the fluorodiol.

The polycondensation of mixtures of the nitraminediols and fluorodiols with formaldehyde is accomplished at room temperature in sulfolane/boron trifluoride etherate solvent. The boron trifluoride etherate is added slowly to a mixture of the nitraminediol, fluorodiol, formaldehyde, and sulfolane to prevent overheating. The crude copolyformal product has some unstable terminal hemiformal groups ($-CH_2OCH_2OH$) as well as some labile dinitramine-derived terminal hydroxy groups. It is important to remove these groups and leave only stable fluorodiol-derived hydroxy terminal groups. This is accomplished by treating the crude copolyformal product with hydrogen peroxide in the present of base in water. Example 1 illustrates this procedure. Further examples can be found in Statutory Invention Registration H730 and in U.S. Pat. No.

4,740,579, both of which are hereby incorporated by reference in their entirety.

Example 1 uses 1,7-dihydroxy-2,4,6-trinitro-2,4,6-triazaheptane, having an estimated detonation pressure of 320 kbar, as the nitramine monomer. To produce a polymer with a low glass transition temperature, 2,2,3,3,4,4,5,5-octafluorohexane-1,6-diol is used as the comonomer. Polymerization is carried out by the reaction of the nitraminediol, fluorodiol, and formaldehyde in the presence of an acid condensing agent (boron trifluororide etherate) at ambient temperature. The resulting polymer is a polyformal having fluorodiol and nitraminediol units incorporated in the backbone. Because the hydroxymethyl groups of the nitraminediol are labile, it is desirable to remove the nitraminediol end groups which are likely to be present in the crude polymer. This is accomplished by treating the crude polymer with hydrogen peroxide in the present of a base. The resulting polymer, after further purification is a resin having a glass transition temperature of about 0° C. and a density of 1.62 g/cm$^3$. Based on analogy with other polyformals described in Statutory Invention Registration H730, the polymer is expected to be difunctional hydroxy-terminated with ends groups deriving from the fluorodiol monomer only, as shown in the following structural formula:

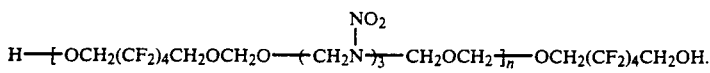

Actually, the nitraminediol and fluorodiol monomer units are more or less randomly distributed with the important exception that essentially all of the terminal monomer units are fluorodiols monomers as shown. The estimated detonation pressure of the repeat unit of this polymer is 217 kbar.

To demonstrate that the polymer is approximately difunctional, hydroxy-terminated, and essentially free of nitraminediol-derived end groups, the polymer was mixed with a plasticizer and cured successfully with a mixture of di- and triisocyanate to give a rubbery gumstock. The preparation of the gumstock is described in example 2.

The copolyformals of this invention preferably have a number average molecular weight of from about 1000 to about 6000 and more preferably from 2000 to 4000. The average molecular weight may be adjusted by varying the stoichiometry (ratio of formaldehyde to diols) and reaction conditions (amount of BF$_3$ etherate and solvent, temperature).

The general nature of the invention having been set forth the following examples are present as a specific illustrations thereof. It will be understood that this invention is not limited to these specific examples, but is susceptible to various modifications that will be recognized by one of ordinary skill in the art.

Example 1

PREPARATION OF POLY(2,2,3,3,4,4,5,5-OXTAFLUOROHEXANEDIOL FORMAL-CO-2,4,6-TRINITRO-2,4,6-TRIAZAHEPTANEDIOL FORMAL)

To a well-stirred mixture of 2.62 g (10 mmol) of 1,6-dihydroxy-2,2,3,3,4,4,5,5-octafluorohexane, 2.70 g (10 mmol) of 1,7-dihydroxy-2,4,6-trinitro-2,4,6-triazaheptane, 3 mL of dry (4A sieves) sulfolane, and 0.6 g (20 mmol) of trioxane was added dropwise with cooling (ice-water) 5 mL of boron trifluoride etherate. The ice-water bath was removed and the mixture was stirred overnight at room temperature. During this period, the mixture became homogeneous. It was then poured into ice-water (15 mL), 20 mL of dichloromethane was added, the mixture was stirred for a few minutes, 1 mL of 30% aqueous hydrogen peroxide was added, and stirring was continued for 3 hours. The organic layer was separated and stirred for 3 hours with a mixture of 10 mL of 1% aqueous KOH and 1 mL of 30% hydrogen peroxide. The phases were separated and the organic layer was washed with brine. Most of the solvent was removed in vacuo and the residual polymer was triturated with distilled water for 3–4hours at 40°–50° C. The water was poured off and trituration fresh distilled water was repeated. The polymer was issolved in 50 mL of tetrahydrofuran and the solution was added to 300 mL of water with vigorous stirring. The aqueous phase was discarded and the precipitated polymer was dissolved in dichloromethane and stirred with about 5 mL of Silica Gel 60 (EM Science) for 8 hours. The silica gel was filtered off and washed with dichloromethane. The solvent was removed from the combined soulutions invacuo, finally at 60°–70° C. to yield 3.7g of polymer which was characterized by $^1$H NMR spectroscopy to ascertain absence of sulfolane, dichloromethane, and tetrahydrofuran solvents.

By comparison of the gel permeation chromatogram with that of poly(octafluorohexanediol formal) the molecular weight of the polymer ($M_N$) was estimated to be 2600. The $^1$H NMR spectrum (d$_6$-acetone) showed the expected signals as follows: δ 6.12, double peak, 5.72, 5.65 (nitramine diol signals; total area 73); 5.13, 5.07 (formal signals; total area 30); 4.33, triplet $J_{HF}=15$ Hz (fluorodiol signal; total area approximately 45).

EXAMPLE 2

GUMSTOCK PREPARATION FROM FLUORODIOL-NITRAMINEDIOL COPOLYMER

A homogeneous mixture of 1 g of the copolymer prepared as in example 1 ($M_N$2600) with 3 g of bis(2,2,2-fluorodinitroethyl)formal was added to 0.1111 g of Desmodur N-100 polyisocyanate, 0.0316 g of IPDI diisocyanate, and 0.003 g of triphenyl bismuth contained in a beaker. The mixture was stirred until homogeneous and then held at 60° C. until it was cured (about 48 hours).

EXAMPLE 3

1,7-DIHYDROXY-2,4,6-TRINITRO-2,4,6-TRIAZAHEPTANE

To 6.7g of 1,7-diacetoxy-2,4,6-trinitro-2,4,6-triazaheptane (18.9 mmol) was added 33 ml of 30% of aqueous HCl. The mixture was then stirred for 48 hours at room temperature. The solid was collected by suction filtration through a sintered glass funnel, washed with distilled water, and dried in vaouo. Collected was 3.9 g (75%); melting point 134°–138°C.; $^1$H NMR spectrum (d$_3$-acetonitrile); δ 5.40 and 5.87.

The method of example 3 can also be used to produce 1,9-dihydroxy-2, 4,6,8-tetranitro-2,4,6,8-tetraazanonane from 1,9-diacetoxy-2,4, 6,8-tetranitro-2,4,6,8-tetraazanonane.

Examples 4 and 5 present prior art methods which were used to prepare the diacetoxymethyl nitramines which can be used as starting materials for preparing the hydroxy terminated nitramines.

Examples 4 and 5 are quoted from page 2772 of an article by W. E. Bachmann, W. J. Horton, E. L. Jenner, N. W. MacNaughton and L. B. Scott, titled, "Cyclic and Linear Nitramines Formed by Nitrolysis of Hexamine," which appeared in the *Journal of the American Chemical Society*, Volume 73, No. 6 (June 1951), pages 2769-2773, herein incorporated by reference in its entirety.

EXAMPLE 4 (PRIOR ART)

"1,7-DIACETOXY-2,4,6-TRINITRO-2,4,6-TRIAZAHEPTANE (IV)

A series of runs were made in which hexamine, nitric acid and acetic anhydride were brought together under various conditions. In (a) is given a procedure in which ease of obtaining a pure compound rather than yield is emphasized. In (b) is given a procedure which employs hexamine dinitrate.

"(a) Forty-give cc. of 98% nitric acid was added gradually with stirring to 120 cc. of acetic anhydride (in a three-necked flask equipped with a thermometer and a paddle stirrer) which was kept at 15°-20° by means of an ice-bath. A solution of 33.6 g of hexamine in 55 cc. of glacial acetic acid was added continuously to the stirred mixture at 15°-20° in twenty minutes The resulting mixture was heated in the course of fifteen minutes to 75°; the clear solution was stirred as it cooled to room temperature; at about 70° a few crystals of IV were introduced. After standing at room temperature for twelve hours, the well-formed crystals of IV were collected on a filter and washed with acetic acid. The moist product was dissolved in 100 cc. of hot acetic acid, and solution after seeding was allowed to cool; yield of colorless plates was 43 g. (51%); m.p. 153°-154.5°.

"The original mother liquor contained additional IV and much water-insoluble gum. The whole was disposed of by converting it into water-soluble products by addition of 700 cc. of water followed by simmering on a steam-bath for three to five hours.

"By omitting the heating to 70°, a 48-g. first crop was obtained which gave 34 g of IV with m.p. 154-155 on recrystallization."

(The reference also discloses a method of making this compound from hexamine dinitrate.)

EXAMPLE 5 (PRIOR ART)

"1,9-diacetoxy-2,4,6,8-tetranitro-2,4,6,8-tetrazanonane (V). Twenty cc. of acetic acid was placed in a four-necked 1-1 flask equipped with a thermometer, paddle stirrer and two burets, and the flask was immersed in an ice-bath. A solution of 33.6 g of hexamine in 55 cc of acetic acid and a cold freshly-prepared mixture (see above) of 21 cc of 98% nitric acid and 60 cc of acetic anhydride were added continuously and equivalently in six minutes to the stirred acetic acid; the temperature of the reaction mixture was kept at 30° . After being stirred at 30° for one-half hour more, the thick mixture was poured into a dry beaker (hood). Acetic anhydride (150 cc) was added to the uncleaned reaction flask; 40 cc of 98% nitric acid was added with cooling, and the four-state reaction product (contained in the beaker) was added in three to five minutes; the temperature was kept at 25°-30°. Acetic anhydride (50 cc) was used to transfer the residual material in the beaker into the reaction mixture.

"The stirred reaction mixture was heated slowly to 70°; brown fumes were evolved and some solid remained undissolved. The bath was removed and the mixture was stirred as it cooled to room temperature. After two hours the product was collected on a filter and washed with acetic acid; yield 41.2 g; m.p. 174°-177°. Recrystallization from 600 cc of acetic acid yielded colorless nacreous plates of V; yield 33.1 g. (32%); m.p. 182.5°-183.5°."

Numerous other modifications and variations of the present invention are possible in light of the foregoing teachings. It is therefore to be understood that within the scope of the appended claims the invention may be practiced otherwise than as specifically described.

What is claimed is:

1. A dihydroxy-terminated copolyformal formed from
A. formaldehyde and
B. a diol comonomer mixture of
  (1) a nitraminediol which is
    $HOCH_2N(NO_2)CH_2N(NO_2)CH_2N(NO_2)CH_2OH$,
    $HOCH_2N(NO_2)CH_2N(NO_2)CH_2N(NO_2)CH_2N(NO_2)CH_2OH$,
    or mixtures thereof, and
  (2) a fluorodiol which is
    $HOCH_2CF_2CF_2CF_2CH_2OH$,
    $HOCH_2CF_2CF_2CF_2CF_2CH_2OH$,
    $HOCH_2CF(CF_3)OCF_2CF_2CF_2CH_2OH$,
    $HOCH_2CF_2OCF_2CF_2OCF_2CH_2OH$,
    $HOCH_2CH_2(CF_2)_2CH_2CH_2OH$,
    $HOCH_2CH_2(CF_2)_4CH_2CH_2OH$,
    $HOCH_2CH_2(CF_2)_6CH_2CH_2OH$,
    $HOCH_2CH_2(CF_2)_8CH_2CH_2OH$,
    $HOCH_2CH_2(CF_2)_{10}CH_2CH_2OH$,
    or mixtures thereof and
  and wherein the nitraminediol comprises from about 10 to about 60 mole percent of the diol comonomer mixture with the fluorodiol being the remainder, and wherein the terminal functional groups are exclusively fluorodiol monomer hydroxy groups.

2. The dihydroxy-terminated copolyformal of claim 1 wherein the nitraminediol comprises from 30 to 60 mole percent of the diol comonomer mixture with the fluorodiol being the remainder.

3. The dihydroxy-terminated copolyformal of claim 2 wherein the nitraminediol comprises from 40 to 60 mole percent of the diol comonomer mixture with the fluorodiol being the remainder.

4. The dihydroxy-terminated copolyformal of claim 1 wherein the nitraminediol is $HOCH_2N(NO_2)CH_2N(NO_2)CH_2N(NO_2)CH_2OH$.

5. The dihydroxy-terminated copolyformal of claim 1 wherein the nitraminediol is $HOCH_2N(NO_2)CH_2N(NO_2)CH_2N(NO_2)CH_2N(NO_2)CH_2OH$.

6. The dihydroxy-terminated copolyformal of claim 1 wherein the fluorodiol is $HOCH_2CF_2CF_2CF_2CF_2CH_2OH$.

7. The dihydroxy-terminated copolyformal of claim 6 wherein the nitraminediol is $HOCH_2N(NO_2)CH_2N(NO_2)CH_2N(NO_2)CH_2OH$.

8. The dihydroxy-terminated copolyformal of claim 6 wherein the nitraminediol is $HOCH_2N(NO_2CH_2N(NO_2)CH_2N(NO_2)CH_2OH$.

9. The dihydroxy-terminated copolyformal of claim 1 wherein the fluorodiol is $HOCH_2CF(CF_3)OCF_2CF_2CF_2CH_2OH$.

10. The dihydroxy-terminated copolyformal of claim 9 wherein the nitraminediol is $HOCH_2N(NO_2)CH_2N(NO_2)CH_2N(NO_2)CH_2OH$.

11. The dihydroxy-terminated copolyformal of claim 9 wherein the nitraminediol is $HOCH_2N(NO_2)CH_2N(NO_2)CH_2N(NO_2)CH_2N(NO_2)CH_2OH$.

12. The dihydroxy-terminated copolyformal of claim 1 wherein the fluorodiol is $HOCH_2CF_2OCF_2CF_2OCF_2CH_2OH$.

13. The dihydroxy-terminated copolyformal of claim 12 wherein the nitraminediol is $HOCH_2N(NO_2)CH_2N(NO_2)CH_2N(NO_2)CH_2OH$.

14. The dihydroxy-terminated copolyformal of claim 12 wherein the nitraminediol is $HOCH_2N(NO_2)CH_2N(NO_2)CH_2N(NO_2)CH_2N(NO_2)CH_2OH$.

15. The dihydroxy-terminated copolyformal of claim 1 wherein the number average molecular weight of the copolyformal is from about 1000 to about 6000.

16. The dihydroxy-terminated copolyformal of claim 15 wherein the number average molecular weight of the copolyformal is from 2000 to 4000.

* * * * *